United States Patent
Jung et al.

(10) Patent No.: US 7,336,334 B2
(45) Date of Patent: Feb. 26, 2008

(54) FABRICATION METHOD OF LIQUID CRYSTAL DISPLAY DEVICE

(75) Inventors: Tae Yong Jung, Gumi-si (KR); Myoung Kyu Kim, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/309,900

(22) Filed: Dec. 5, 2002

(65) Prior Publication Data

US 2003/0107699 A1 Jun. 12, 2003

(30) Foreign Application Priority Data

Dec. 6, 2001 (KR) .................... 10-2001-0077070

(51) Int. Cl.
*G02F 1/1339* (2006.01)
*G02F 1/1341* (2006.01)

(52) U.S. Cl. .................. 349/154; 349/153; 349/189; 349/190

(58) Field of Classification Search ............. 349/153, 349/187, 189, 190, 154; 438/30, 456
See application file for complete search history.

(56) References Cited

U.S. PATENT DOCUMENTS

| 5,410,423 | A | * | 4/1995 | Furushima et al. ......... 349/190 |
| 5,766,493 | A | | 6/1998 | Shin |
| 5,835,176 | A | | 11/1998 | Jeong et al. |
| 6,108,063 | A | * | 8/2000 | Yuuki et al. .................. 349/95 |
| 6,197,209 | B1 | | 3/2001 | Shin et al. |
| 6,239,855 | B1 | * | 5/2001 | Nakahara et al. .......... 349/153 |
| 6,285,417 | B1 | * | 9/2001 | Ahn et al. .................... 349/23 |
| 6,473,148 | B1 | * | 10/2002 | Suh ............................. 349/153 |
| 2001/0012088 | A1 | * | 8/2001 | Jeong ......................... 349/153 |
| 2001/0022645 | A1 | * | 9/2001 | Lee et al. .................... 349/153 |

FOREIGN PATENT DOCUMENTS

| JP | 2-138459 | 5/1990 |
| JP | 3-22390 | 1/1991 |
| JP | 4-116619 | 4/1992 |
| JP | 5-249422 | 9/1993 |
| JP | 5-249423 | 9/1993 |
| JP | 7-168172 | 7/1995 |

* cited by examiner

*Primary Examiner*—Michael H. Caley
(74) *Attorney, Agent, or Firm*—McKenna, Long & Aldridge LLP

(57) ABSTRACT

The present invention is related to a method of fabricating a liquid crystal display device which includes etching an attached substrate using an etchant to make the substrate thin and light. A plurality of main seal patterns are formed on a first substrate and auxiliary seal patterns are formed around each main seal pattern. Thereafter, a second substrate is attached to the first substrate by pressure. Then, an anti-etching material is formed around the sidewalls of the attached substrates. Due to the anti-etching material, an etchant etching the surfaces of the attached substrate does not penetrate into the interval between the first and second substrates.

50 Claims, 5 Drawing Sheets

FABRICATION METHOD OF LIQUID CRYSTAL DISPLAY DEVICE

This application claims the benefit of Korean Patent Application No. 2001-0077070, filed on Dec. 6, 2001, which is hereby incorporated by reference as if fully set forth herein.

BACKGROUND OF THE INVENTION

1. Field of the Invention

The present invention relates to a fabrication method of a liquid crystal display device, and more particularly to a method of forming sealants and/or seal patterns for preventing damage during a process of etching substrates.

2. Discussion of the Related Art

As information technologies rapidly develop, flat panel display devices that are slim and light are developed in accordance with the pace of the technology development. A liquid crystal display (LCD) device, which is more researched and developed, is an example of the flat panel display device. The LCD device can produce high quality images at a reasonable cost these days.

A typical LCD device includes an upper substrate, a lower substrate, and a liquid crystal interposed therebetween. The upper and lower substrates respectively have electrodes opposing each other. When an electric field is applied between the electrodes of the upper and lower substrates, molecules of the liquid crystal are aligned according to the electric field. By controlling the above-mentioned electric field, the liquid crystal display device provides various transmittances for light such that an image is displayed.

A fabrication process of the LCD device includes forming an array substrate, forming a color filter substrate, and a cell fabrication process. By the process of forming the array substrate, the array substrate includes thin film transistors, pixel electrodes and other elements. By the process of forming the color filter substrate, the color filter substrate includes color filters and common electrodes. During the cell process, the array substrate and the color filter substrate are aligned and attached to each other so that the common electrodes and the pixel electrodes face each other; the liquid crystal material is injected between the array and color filter substrates; via an injection hole that is subsequently sealed by sealant; and polarizers are applied to the outer surfaces of the array and color filter substrates.

When fabricating the LCD device, a plurality of cells are formed in a large substrate panel in order to increase productivity of the LCD device. In this case, the large substrate panel is cut into individual cells during the cell process after aligning and attaching the color filter substrate to the array substrate. The detailed explanation of the cell process will be presented with reference to FIG. 1.

FIG. 1 is a flow chart illustrating a fabrication process of a liquid crystal cell according to a related art.

At step st1 an array substrate, (often referred to as a thin film transistor substrate) including an array matrix of thin film transistors and pixel electrodes is formed and a color filter substrate, including a color filter layer and a common electrode is formed. The thin film transistor substrate is formed by repeatedly depositing and patterning thin films. Patterning the thin films using masks is a critical process in the formation of the thin film transistor substrate. How to decrease the steps in mask processes during the patterning process has become a major issue that has been enthusiastically researched and developed in order to reduce a manufacturing cost. The color filter substrate includes red, green and blue color filters, and a black matrix that isolates each color filter and prevents light leakage in a portion except for pixel regions. The color filter substrate also includes a common electrode. There are many methods of forming the color filters, such as a dyeing method, a pigment dispersion method, a staining method, a printing method, etc. Among these methods, the pigment dispersion method is mainly used in forming the color filters.

In step st2, orientation films are formed on the thin film transistor and color filter substrates to determine an initial alignment direction of the liquid crystal molecules. Formation of the orientation film includes depositing a polymeric thin film and subsequently performing a uniform rubbing process. The rubbing process determines an initial alignment direction and supplies the normal operation of the liquid crystal layer and the uniform display characteristic of the LCD device. The rubbing process easily determines and controls the pretilt angle of the liquid crystal molecules, provides a stable alignment of the liquid crystal molecules, and is adequate to produce the LCD devices on a large scale. Typically, an organic material of the polyimide series is used as the orientation film. The rubbing method includes rubbing the orientation film along the specific direction with a rubbing cloth, thereby aligning the liquid crystal molecules along the rubbing direction.

In step st3, seal patterns are formed in one of the thin film transistor and color filter substrates. In the liquid crystal cell, the seal pattern serves two functions: forming a gap for liquid crystal material injection and confining the injected liquid crystal material. The seal patterns are respectively formed in an area for each cell. The seal patterning process forms a desired pattern by application of a thermosetting resin. A screen-printing method using a screen mask or a seal-dispenser method using a dispenser is typically used for this process. Although the screen-printing method is used more frequently than the seal-dispenser method for the shake of convenience in the manufacturing process, the screen-printing method may cause defects because the screen mask for printing contacts the orientation film. Further, using the screen mask it is difficult to cover the entire substrate as the substrate becomes larger. Therefore, the seal-dispenser method has been adopted more and more recently.

In step st4, a spacer is sprayed on one of the thin film transistor and color filter substrates. The size of the spacer used in the liquid crystal cell maintains a precise and uniform gap between the thin film transistor substrate and the color filter substrate. Accordingly, the spacers are uniformly sprayed on the lower substrate. The method of spraying the spacer includes a wet-spraying method and a dry-spraying method. In the wet-spraying method, the spacer is mixed with alcohol and then sprayed on the substrate. In the dry-spraying method, only the spacer is sprayed on the substrate without any mixture. The dry-spraying method utilizes either one or both of a high speed gas stream manner and an electrostatic dispersion manner. In high speed gas stream manner a predetermined amount of spacer particle is electrified by friction through pipes, and the spacer particle is then expelled from a nozzle to the substrate. In addition, in the electrostatic dispersion manner a spacer particle is expelled from a high-voltage-applied nozzle to a grounded substrate.

In step st5, the thin film transistor and the color filter substrate are aligned and attached by a thermal-hardening process under pressure. The alignment margin between the color filter substrate and the thin film transistor substrate is determined by the device design, and accuracy within a few micrometers is generally required. If the alignment margin is exceeded, the liquid crystal cell will not operate adequately due to light leakage.

In step st6, the attached substrate is divided into unit cells. Generally, a plurality of unit cells are formed on a large sized glass substrate and then divided through a cutting process. In some LCD device fabrication processes, the unit cells are separated after simultaneous injection of the liquid crystal material into the plurality of unit cells. However, injection of liquid crystal material is commonly performed after a large sized liquid crystal substrate is cut into unit cells due to an increased unit cell size. The cell cutting process includes a scribe process that forms cutting lines on a surface of the substrate using a diamond pen, the hardness of which is higher than that of the glass substrate, and a break process that divides the substrate by force.

In step st7, a liquid crystal material is injected into the unit cells. A typical unit cell has a size of several hundred square centimeters with a gap of several micrometers. Accordingly, a vacuum injection method using pressure difference between the interior and exterior of the unit cell is commonly used as an effective injection method. When the liquid crystal material is interposed in the unit cells, air bubbles may exist in the liquid crystal layer and these air bubbles may cause the defects. Thus, the liquid crystal material should be left under a vacuum condition for a sufficiently long time to eliminate the air bubbles from the liquid crystal (i.e., a de-aeration process).

After injecting the liquid crystal material into the unit cell, an injection hole through which the liquid crystal material was injected is sealed to prevent the liquid crystal material from leaking from the unit cell. Sealing the injection hole includes applying a thermosetting material to the injection hole using a dispenser and then hardening the applied thermosetting material.

After manufacturing the liquid crystal cell as described before, polarizers are attached in the outer parts of the liquid crystal cell and then a driving circuit is connected to the liquid crystal cell, thereby forming a liquid crystal display panel.

The liquid crystal display panel fabricated by the above-described process is typically used as a monitor of the laptop computer. Since the laptop computer should be portable to carry from one place to another, the laptop computer requires a light weight with a small bulk. Thus, the liquid crystal display panel used for the laptop computer must be thin and light.

In order to decrease the thickness and weight of the liquid crystal display panel, the outer surfaces of the attached substrate (the color filter substrate and the thin film transistor substrate) are substantially etched after the attachment process (the step st5 of FIG. 1) and before the cell-cutting process (the step st6 of FIG. 1).

FIG. 2 show a flow chart illustrating an etch process of the attached substrate.

In step st11, alien substances that may have adhered to the outer surfaces of the color filter and thin film transistor substrates are removed from the attached substrate before surface-etching the attached substrates. If these alien substances remain on the outer surfaces of the attached substrate before the surface etching, the etching process is not properly performed around the alien substance, causing etching defects. Thus, the outer surfaces of the attached substrate are rough and rugged. The rough surfaces let the incoming or outgoing light to scattered-reflect and refract. Namely, they cause the scattered reflection and refraction of the light. Thus, the alien substances should be removed from the surfaces of the attached substrate. As a cleaner for removing the alien substances, isopropyl alcohol or deionized water is applied to the outer surface of the attached substrate.

In step st12, the attached substrate is etched. A glass substrate is generally used as a substrate for the LCD device. Since the glass substrate includes about 60% of silicon oxide ($SiO_2$), an HF (hydrogen fluoride) solution is used as an etchant for etching the attached substrate.

Next, the etched substrate is rinsed (step st13), and then a drying process for drying the etched substrate is performed (step st14).

After etching the outer surfaces of the attached substrate, the cell-cutting process (step st6 of FIG. 1) and the injection of liquid crystal material (step st7 of FIG. 1) are sequentially performed. However, during the etching process (step st12 of FIG. 2), the etchant permeates and spreads between two substrates so that the seal patterns are damaged and the array matrix elements are eroded. Thus, in order to overcome these problems, other seal patterns having an advantageous configuration are suggested.

FIG. 3 is a plan view illustrating a seal pattern structure according to a related art, and FIG. 4 is an enlarged plan view illustrating a portion A of FIG. 3.

As shown in FIGS. 3 and 4, a plurality of seal patterns are formed on a substrate 10. The seal patterns are classified as a main seal pattern 20 that defines the unit cell and confines the injected liquid crystal material, a first auxiliary seal pattern 30 that surrounds the main seal pattern 20, and a second auxiliary seal pattern 40 that surrounds the first auxiliary seal pattern 30 and is positioned in periphery of the substrate 10. The first and second auxiliary seal patterns 30 and 40 each have at least one opening T, respectively. Furthermore, a plurality of third auxiliary seal patterns 50 are formed between the first and second auxiliary seal patterns 30 and 40 near the opening T of the second auxiliary seal pattern 40.

FIG. 4 is an enlarged plan view of a portion A of FIG. 3 and a detailed illustration of the third auxiliary seal patterns 50. As shown, the third auxiliary seal patterns 50 are formed parallel to one another and spaced apart from each other. One end of the third auxiliary seal patterns 50 contacts the first auxiliary seal pattern 30 or the second auxiliary seal pattern 40, and the other ends of the third auxiliary seal pattern 50 are spaced apart from the first auxiliary seal pattern 30 or the second auxiliary seal pattern 40. The third seal patterns 50 contacting the first auxiliary seal pattern 30 are alternately disposed between the third seal patterns 50 contacting the second auxiliary seal patterns 40.

Therefore, in FIGS. 3 and 4, the inside of the first to third auxiliary seal patterns 30, 40 and 50 is not isolated from the outside, and the air can communicates through the openings T of the first and second auxiliary seal patterns 30 and 40. Namely, the air inside the seal patterns can flow out though the openings T and through the third seal patterns 50 when attaching the upper and lower substrates to each other.

However, in practice, the auxiliary seal patterns are too complex for the air to flow out. Thus, when the substrate having the seal patterns is attached to the other substrate using a hot press process, the air inside the seal patterns is blocked by the seal patterns and is blocked from coming out of the inside. The air kept inside the seal patterns causes breakage of the seal patterns. This breakage of the seal patterns allows the etchant to come into contact with the main seal pattern 20 of the liquid crystal cell when the outer surfaces of the attached substrate are etched. Thus, the main seal pattern 20 can be damaged and etchant may leak into the cell gap.

SUMMARY OF THE INVENTION

Accordingly, the present invention is directed to a method of fabricating a liquid crystal display device, which substantially obviates one or more of problems due to limitations and disadvantages of the related art.

An advantage of the present invention is to provide a method of forming a liquid crystal display device that can prevent penetration and spread of an etchant into a liquid crystal cell when etching outer surfaces of an attached substrate for making a thin and light liquid crystal display panel.

Another advantage of the present invention is to provide a method of forming a liquid crystal display panel that can protect seal patterns from breaking.

Additional features and advantages of the invention will be set forth in the description that follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes preparing first and second substrates having a plurality of cell regions; forming main seal patterns on the first substrate, each seal pattern having at least an opening and defining the unit cell; forming auxiliary seal patterns around each main seal pattern; attaching the second substrate to the first substrate having main and auxiliary seal patterns, thereby forming an attached substrate; forming an anti-etching material on the sidewalls of the attached substrate so as to seal up an interval between the first and second substrates; and etching outer surfaces of the attached substrate having the anti-etching material by dipping into an etchant of an etching device.

In another aspect of the present invention, the anti-etching material includes polytetrafluoroethylene (PTFE), which is often called Teflon. The anti-etching material has a tape shape, a semicircular shape or a capping shape. The tape-shaped anti-etching material is taped around the sidewalls of the attached substrate. The capping-shaped anti-etching material covers the periphery of the attached substrate. The etchant is a mixture of deionized water and hydrogen fluoride in order to etch the surfaces of the attached substrate which include a glass. Beneficially, the auxiliary seal patterns have at least one opening that corresponds to the opening of the main seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used throughout the drawings to refer to the same or similar parts.

Figure 5:
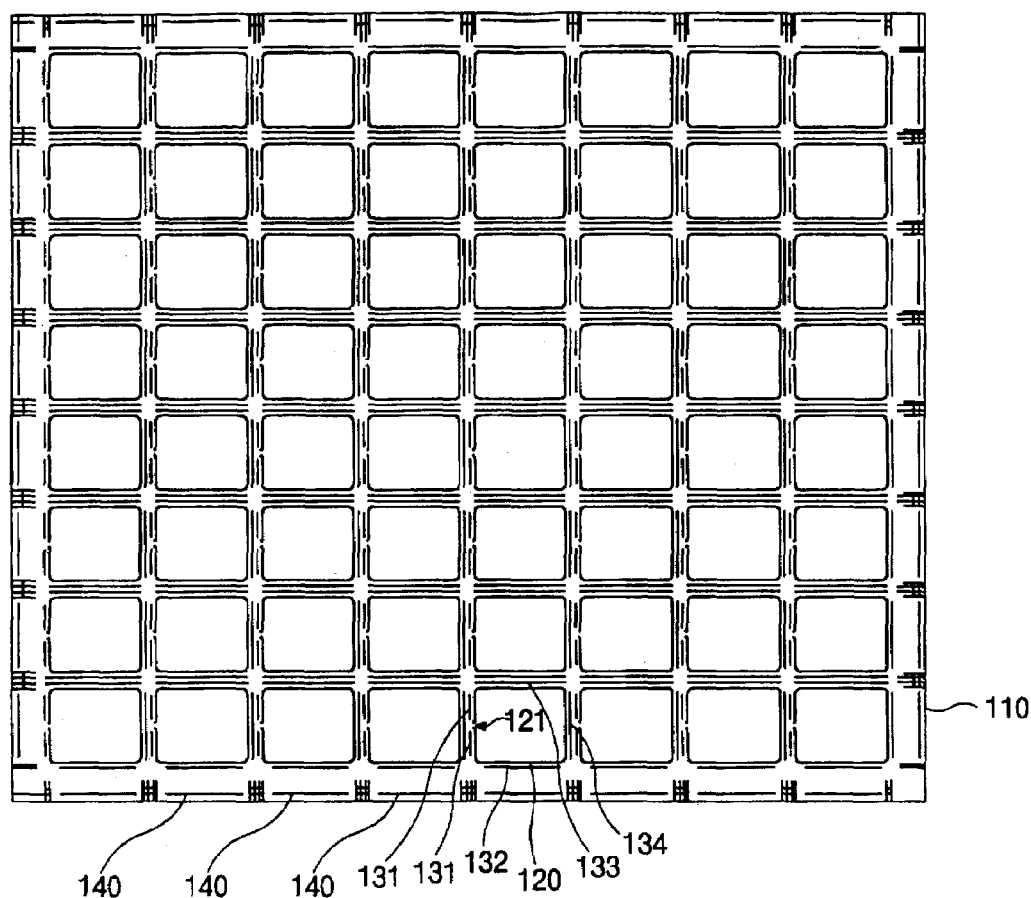
FIG. 5 is a plan view illustrating a seal pattern structure according to the present invention.

FIG. 5 is a plan view illustrating a seal pattern structure according to the present invention. As shown, a plurality of main seal patterns 120 are formed on a substrate 110. Each main seal pattern 120 defines a cell region. Around each main seal pattern, first auxiliary seal patterns 131, 132, 133 and 134 are disposed. Second auxiliary seal patterns 140 are formed in peripheries of the substrate 110. The main seal patterns 120 forms a cell gap for injecting a liquid crystal material and for preventing the leakage of the injected liquid crystal material. Each main seal pattern 120 has an injection hole 121 on a side. The number of the injection holes 121 may be more than one depending on the size of the liquid crystal cell. The first auxiliary seal patterns 131, 132, 133 and 134 have at least one opening that may correspond to the injection hole 121. For example, in the embodiment illustrated in FIG. 5, first auxiliary seal pattern 131 has an opening corresponding to injection hole 121. More than one opening can be formed among the first auxiliary seal patterns 131, 132, 133 and 134. Further, since the auxiliary seal patterns 131, 132, 133 and 134 surround each main seal pattern 120, these auxiliary seal patterns 131, 132, 133 and 134 work with together with the surrounding main seal pattern in a formation of a seal. Therefore, the auxiliary seal patterns 131, 132, 133 and 134 supports the liquid crystal cell to maintain the cell region when the attached substrate is cut into unit cells.

In the above-mentioned seal pattern structure with reference to FIG. 5, the air inside the seal patterns can freely flow out when the upper and lower substrates are attached to each other. Thus, the breakage of the seal patterns is prevented.

After attaching the upper and lower substrates, about 20 pieces of attached substrate are put into an etching device and then soaked by an etchant to etch the outer surfaces of the attached substrate. In the present invention, an anti-etching material 230 is provided to surround the attached substrate to prevent penetration of the etchant, as shown in FIG. 6, before putting the attached substrate into the etching device.

Figure 6:
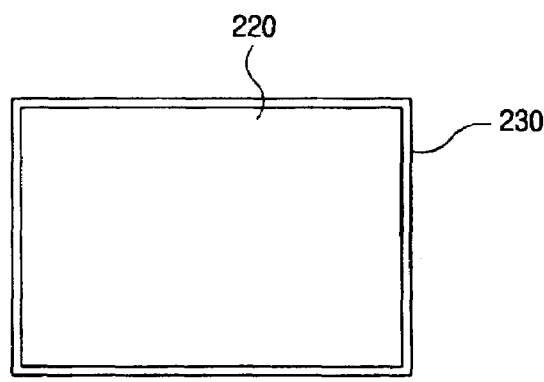
FIG. 6 is a plan view illustrating an attached substrate according to the present invention.

FIG. 6 is a plan view illustrating an attached substrate according to the present invention. The numeral 220 denotes an upper substrate after it is attached to a lower substrate underneath.

Figure 7A:
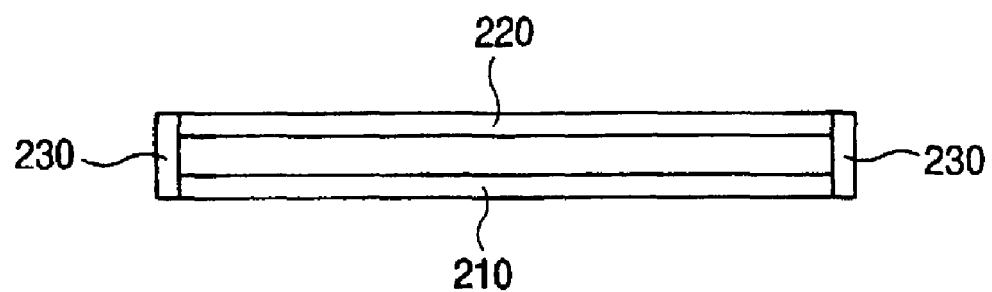
FIGS. 7A to 7C are cross-sectional views each illustrating the attached substrate according to the present invention.
Figure 7B:
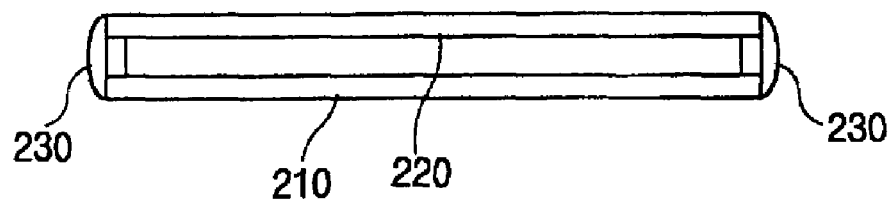
Figure 7C:
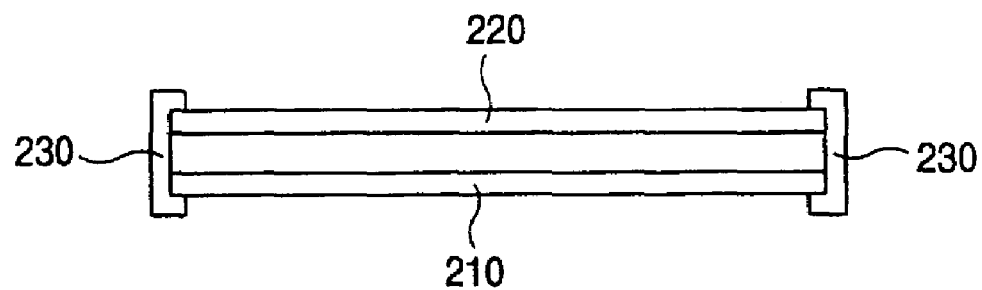

FIGS. 7A to 7C are cross-sectional views each illustrating the attached substrate according to the present invention.

Referring to FIGS. 7A to 7C, a first substrate 210 (often referred to as a lower or TFT array substrate) and a second substrate 220 (often referred to as an upper or color filter substrate) are attached to each other with an interval there between. The interval is formed by the seal patterns (not shown in FIGS. 7A to 7C, but shown in FIG. 5). The anti-etching material 230 that is not affected by the etchant is formed on the sidewalls or along the side edges of the attached substrates 210 and 220 and surrounds the attached substrate along the sidewalls or side edges to seal the interval between the first and second substrates 210 and 220. Thus, the anti-etching material 230 prevents the penetration and spread of the etching solution into the interval between the first and second substrates 210 and 220.

The anti-etching material 230 can have a tape shape to tape around the sidewalls of the attached substrates 210 and 220, as shown in FIG. 7A. At this time, the width of the tape-shaped anti-etching material 230 is the same as a thickness of the attached substrates.

As shown in FIG. 7B, the anti-etching material 230 can have a semicircular or domed shape. Furthermore, the anti-etching material 230 can have a capping shape, for example, roughly a "C" shape or concave shape, that covers the periphery of the attached substrate to "cap" the exposed ends of the attached substrates, as shown in FIG. 7C.

As shown, for example in FIG. 7B, a portion of the anti-etching material may protrude into the cell gap between the substrates. As such, the anti-etching may also assist in maintaining the cell gap.

As described hereinbefore, the anti-etching material 230 of the present invention is a material that should not be affected by the etchant. Among the various materials that are resistant against the etchant, the anti-etching material 230 is advisably made of polytetrafluoroethylene (PTFE), which is often called as "Teflon."

The Teflon is synthetic resin having a good insulating property. The Teflon has an absorptive property of 0.00% and is not corroded by acid or alkali at a temperature of 260 degrees Celsius. Further, the coefficient of friction of the Teflon is low and the Teflon does not have adhesiveness, thereby achieving a good durability. Accordingly, the Teflon is a quite useful material at a temperature in a range of −100 to 260 degrees Celsius.

Figure 1:
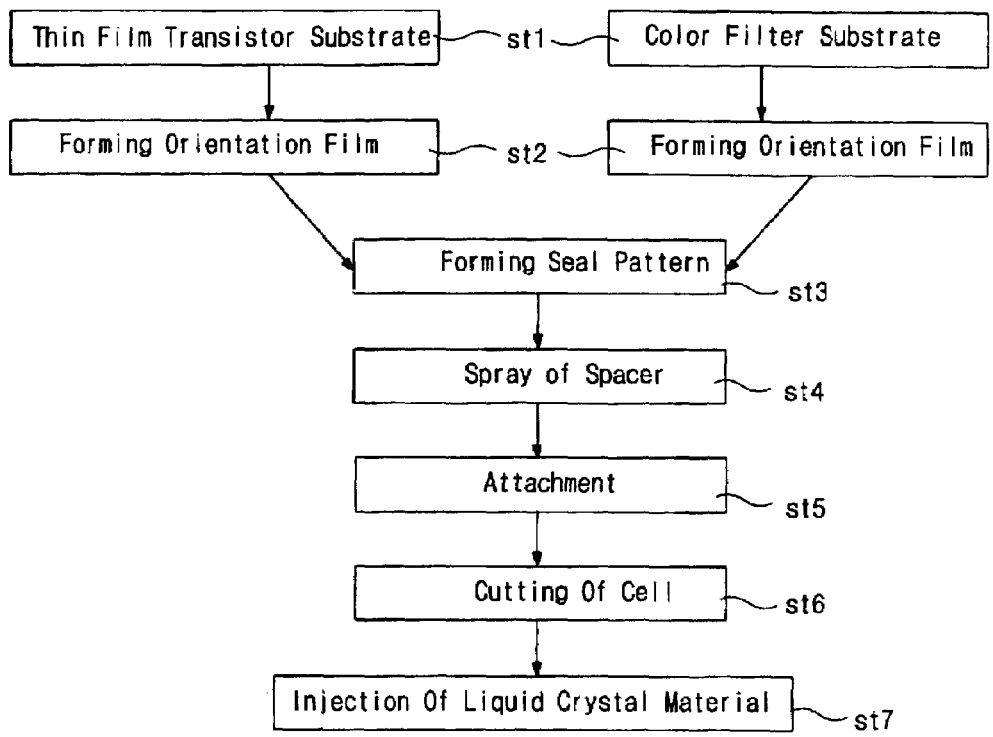
FIG. 1 is a flow chart illustrating a fabrication process of a liquid crystal cell according to a related art.
Figure 2:
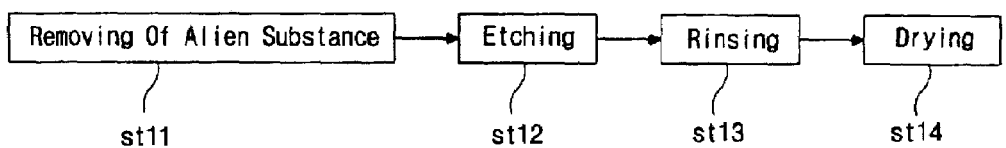
FIG. 2 is a flow chart illustrating an etch process of the attached substrate.
Figure 3:
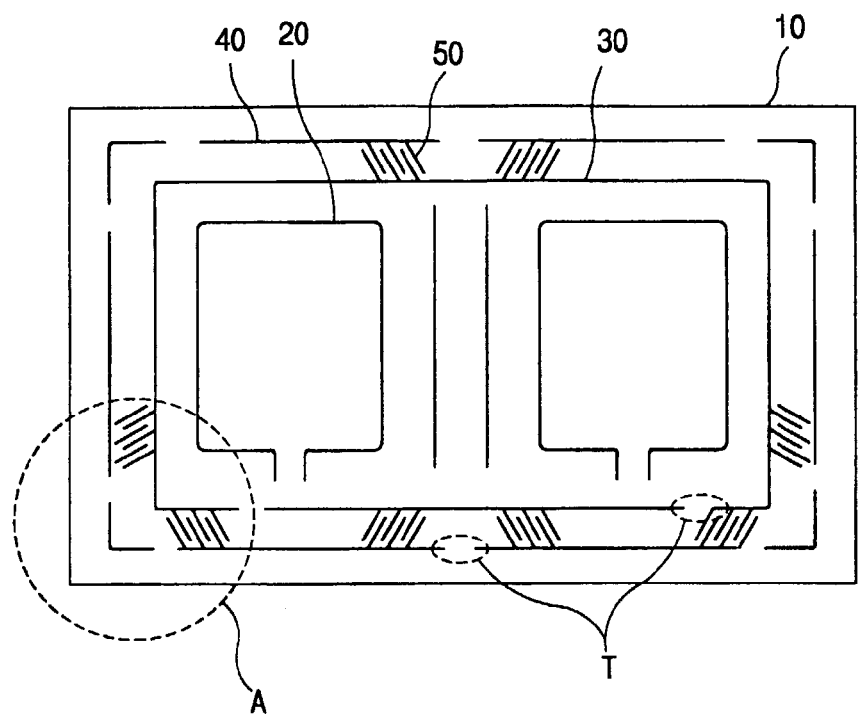
FIG. 3 is a plan view illustrating a seal pattern structure according to a related art.
Figure 4:
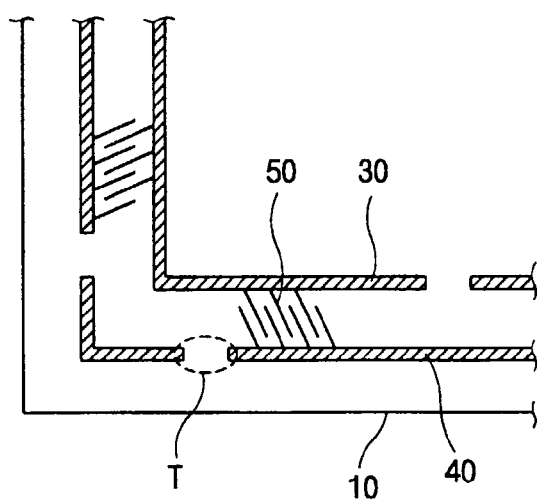
FIG. 4 is an enlarged plan view illustrating a portion A of FIG. 3.
Figure 8:
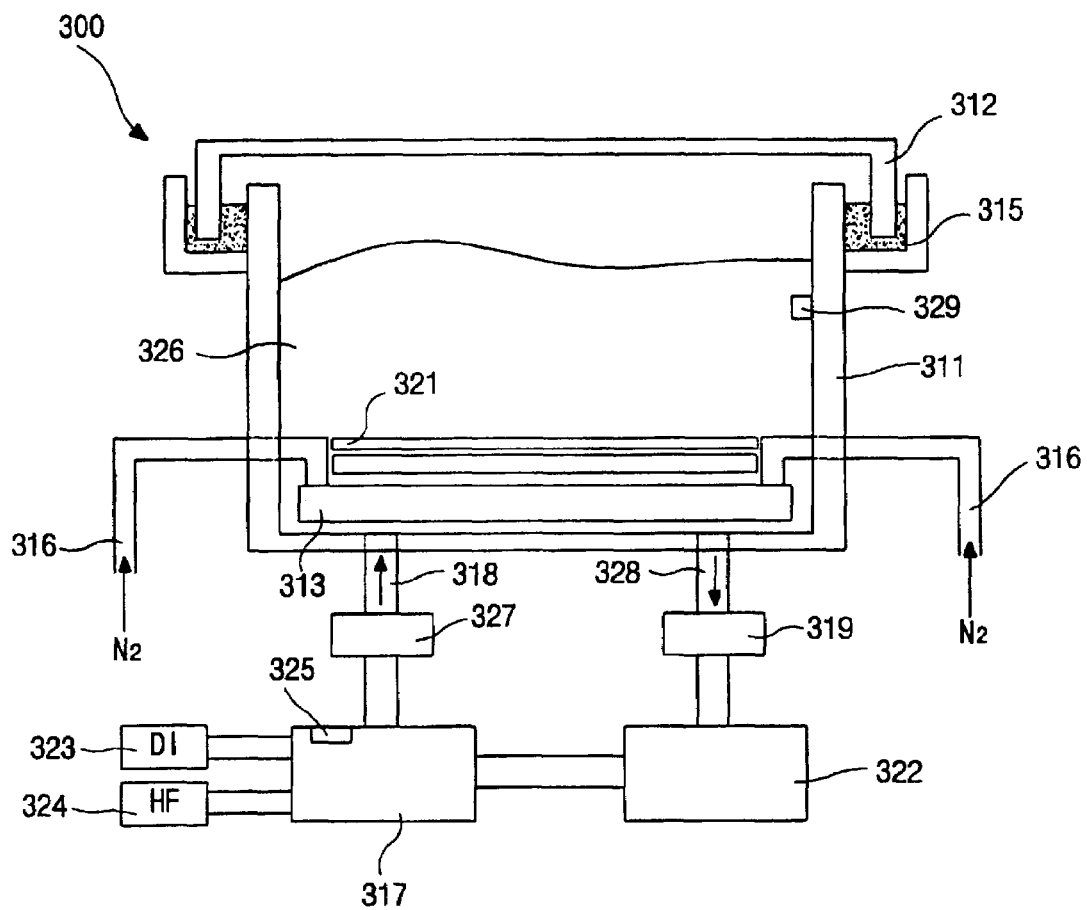
FIG. 8 is a schematic diagrammatical illustration of a glass substrate etching device according to the present invention.

FIG. 8 is a schematic diagrammatical illustration of a glass substrate etching device according to the present invention. The glass substrate etching device 300 maybe used in the etching step st12 of FIG. 2. As shown in FIG. 8, the glass substrate etching device 300 includes a vessel 311, a coverlet 312 that covers the vessel 311, and a bubble plate 313 that is disposed at the bottom of the vessel 311. When the coverlet 312 is on the vessel 311, the vessel 311 is sealed by a water sealant 315. Gas pipes 316 are connected to both sides of the bubble plate 313. The gas pipes 316 supply gases, such as nitrogen ($N_2$) and oxygen ($O_2$), for example, from gas containers (not shown). The vessel 311 contains an etchant 326 to etch a glass substrate 321 that is disposed over the bubble plate 313. Here, the glass substrate 321 is formed by the aforementioned inventive process with reference to FIGS. 5-7.

Still referring to FIG. 8, there are a mixing tank 317 and a buffer tank 328 under the vessel 311. The mixing tank 317 is connected to the bottom of the vessel 311 through an etchant inflow pipe 318, and the buffer tank 322 is also connected to the bottom of the vessel 311 through an etchant outflow pipe 328. The etchant used for etching the glass substrate 321 exhausts to the buffer tank 322 through the etchant outflow pipe 328. A filter 319 is located in the etchant outflow pipe 328 so that the used etchant is cleaned by that filter 319 and then contained in the buffer tank 322. Namely, the filter 319 between the vessel 311 and the buffer tank 322 eliminates impurities from the used etchant. The refined etchant contained in the buffer tank 322 is supplied to the mixing tank 317. In the mixing tank 317, deionized water (DI) that is supplied from a DI supply 312 and hydrogen fluoride (HF) that is supplied from a HF supply 324 are mixed. The concentration of a mixed solution (deionized water and hydrogen fluride) is checked by a concentration measurement device 325 so that if a desired concentration of mixed solution is achieved, the supply of DI and HF stops. At this time, the desired concentration is determined in a range of about 1 to 50%. Furthermore, a cooling water (PCW) pipe (not shown) is installed in the mixing tank 317 so that the mixed solution of DI and HF is maintained at a certain temperature in the mixing tank 317. A pump 327 supplies the mixed solution in the mixing tank 317 to the vessel 311 to etch the glass substrate 321.

In FIG. 8, a temperature sensor 329 is installed in the vessel 311 in order to detect a temperature change caused by of an exothermic reaction of the glass substrate 321 and the etchant 326. Etching the glass substrate 321 is checked through the temperature change. By checking the temperature measured by the temperature sensor 329, it can be determined how much of the substrate is etched. From the manner described above, the substrate of 1.4 mm thickness can be etched to have a thickness of 0.5 mm. The temperature setting in the vessel 311 is determined by the following equation to determine the etching duration. Namely, the etching of the substrate 321 automatically stops when the desired temperature is achieved.

$$T_t = T_i + (K_r \cdot N \cdot \Delta t_2)/m$$

$T_t$: desired temperature,
$T_i$: initial temperature,
$K_r$: reaction coefficient,
N: number of substrate,
$\Delta t_2$: desired thickness to be removed,
m: mass of the etching bath Using the glass substrate etching device 300, the glass substrate 321 can become thinner. The process of etching the substrate 321 can control the thickness of the etched substrate by way of detecting the temperature change caused by the exothermic reaction of the glass substrate and etchant. The above-mentioned etching process is performed after attaching the upper and lower substrates to each other. Also, that etching process can be performed after or before injecting the liquid crystal material into the interval between the upper and lower substrates. The substrate 321 (i.e., the attached substrate of upper and lower) is surrounded by the anti-etching material before it is etched by the above-mentioned etching apparatus.

Accordingly, the present invention has the following advantages. Since the seal patterns of the present invention are not much more complicated than that of the related art, the seal patterns are not broken by the air when the upper and lower substrates are attached by pressure. And since the anti-etching material is formed around the sidewalls of the attached substrate, the etchant etching the outer surfaces of the attached substrate does not permeate into the interval between the upper and lower substrates.

It will be apparent to those skilled in the art that various modifications and variation can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   preparing first and second substrates having a plurality of unit cells;
   forming main seal patterns on one of the first and second substrates, each main seal pattern having at least an injection hole and defining a unit cell;
   forming a first auxiliary seal pattern at a periphery of said one of the first and second substrates, the first auxiliary seal pattern including an opening corresponding to a space between the two unit cells;
   forming a plurality of second auxiliary seal patterns so as to surround each main seal pattern individually, wherein each second auxiliary seal pattern includes an opening adjacent to the injection hole of a respective main seal pattern;
   attaching the second substrate to the first substrate, thereby forming attached substrates;
   forming an anti-etching material at the side edges of the attached substrates so as to seal an interval between the first and second substrates;
   etching outer surfaces of the attached substrates by dipping into an etchant of an etching device; and
   separating the attached first and second substrates into the plurality of unit cells, wherein each of the separated unit cells maintains a cell region supported by the respective main seal pattern as well as the respective second auxiliary seal pattern.

2. The method of claim 1, wherein the anti-etching material includes polytetrafluoroethylene (PTFE).

3. The method of claim 1, wherein the anti-etching material has a tape shape.

4. The method of claim 3, wherein the tape-shaped anti-etching material is taped around the side edges of the attached substrates.

5. The method of claim 1, wherein the anti-etching material has a rectangular shape.

6. The method of claim 5, wherein a portion of the anti-etching material protrudes into the cell gap between the first and second substrates.

7. The method of claim 1, wherein the anti-etching material has a semicircular shape.

8. The method of claim 7, wherein a portion of the anti-etching material protrudes into the cell gap between the first and second substrates.

9. The method of claim 1, wherein the anti-etching material has a domed shape.

10. The method of claim 9, wherein a portion of the anti-etching material protrudes into the cell gap between the first and second substrates.

11. The method of claim 1, wherein the anti-etching material has a "C" shape.

12. The method of claim 1, wherein the anti-etching material has a concave shape.

13. The method of claim 1, wherein the anti-etching material has a capping shape.

14. The method of claim 13, wherein the capping-shaped anti-etching material covers a periphery of the attached substrates.

15. The method of claim 13, wherein the capping-shaped anti-etching material covers side edges of the attached substrates.

16. The method of claim 13, wherein a portion of the anti-etching material protrudes into the cell gap between the first and second substrates.

17. The method of claim 1, wherein the first and second substrates include a glass.

18. The method of claim 1, wherein the second auxiliary seal patterns have at least one opening.

19. The method of claim 18, wherein the opening of the second auxiliary seal pattern corresponds to the opening of the main seal pattern.

20. The method of claim 1, wherein said etching includes dipping the attached substrates into an etchant.

21. The method of claim 20, wherein the etchant is a mixture of deionized water and hydrogen fluoride.

22. The method of claim 1, wherein each of the plurality of second auxiliary seal pattern are separated from each other.

23. The method of claim 1, further comprising providing liquid crystal material between the attached substrates before etching the outer surfaces of the attached substrates.

24. The method of claim 1, further comprising providing liquid crystal material between the attached substrates after etching the outer surfaces of the attached substrates.

25. A method of fabricating a liquid crystal display device, comprising:
   forming main seal patterns on a first substrate, wherein each main seal pattern includes at least one injection hole defined therein;
   attaching a second substrate to the first substrate, thereby forming an attached substrate;
   forming an anti-etching material along side edges of the attached substrate so as to seal an interval between the first and second substrates;
   etching outer surfaces of the attached substrate, wherein each main seal pattern has at least an opening and defines a unit cell,
   forming a first auxiliary seal pattern at a periphery of said one of the first and second substrates, the first auxiliary seal pattern including an opening corresponding to a space between the two unit cells;
   forming a plurality of second auxiliary seal patterns so as to surround each main seal pattern individually, wherein each second auxiliary seal pattern includes an opening adjacent to the injection hole of a respective main seal pattern; and
   separating the attached first and second substrates into the unit cells, wherein each of the separated unit cells maintains a cell region supported by the respective main seal pattern as well as the respective second auxiliary seal pattern.

26. The method of claim 25, wherein the anti-etching material includes polytetrafluoroethylene (PTFE).

27. The method of claim 25, wherein the anti-etching material has a tape shape.

28. The method of claim 27, wherein the tape-shaped anti-etching material is taped around the side edges of the attached substrates.

29. The method of claim 25, wherein the anti-etching material has a rectangular shape.

30. The method of claim 29, wherein a portion of the anti-etching material protrudes into the cell gap between the first and second substrates.

31. The method of claim 25, wherein the anti-etching material has a semicircular shape.

32. The method of claim 31, wherein a portion of the anti-etching material protrudes into the cell gap between the first and second substrates.

33. The method of claim 25, wherein the anti-etching material has a domed shape.

34. The method of claim 33, wherein a portion of the anti-etching material protrudes into the cell gap between the first and second substrates.

35. The method of claim 25, wherein the anti-etching material has a "C" shape.

36. The method of claim 25, wherein the anti-etching material has a concave shape.

37. The method of claim 25, wherein the anti-etching material has a capping shape.

38. The method of claim 37, wherein the capping-shaped anti-etching material covers a periphery of the attached substrates.

39. The method of claim 37, wherein the capping-shaped anti-etching material covers side edges of the attached substrates.

40. The method of claim 37, wherein a portion of the anti-etching material protrudes into the cell gap between the first and second substrates.

41. The method of claim 25, wherein the first and second substrates include glass.

42. The method of claim 25, wherein the main seal patterns have at least one opening and the second auxiliary seal patterns have at least one opening.

43. The method of claim 42, wherein the opening of the second auxiliary seal patterns corresponds to the opening of the main seal patterns.

44. The method of claim 25, wherein said etching includes dipping the attached substrates into an etchant.

45. The method of claim 44, wherein the etchant is a mixture of deionized water and hydrogen fluoride.

46. The method of claim 25, wherein each of the plurality of second auxiliary seal pattern are separated from each other.

47. The method of claim 25, further comprising providing liquid crystal material between the attached substrate before etching the outer surfaces of the attached substrate.

48. The method of claim 25, further comprising providing liquid crystal material between the attached substrate after etching the outer surfaces of the attached substrate.

49. A method of fabricating a liquid crystal display device, comprising:

preparing first and second substrates having a plurality of unit cells;

forming main seal patterns on one of the first and second substrates, each main seal pattern having at least an injection hole and defining a unit cell;

forming a first auxiliary seal pattern at a periphery of said one of the first and second substrates, the first auxiliary seal pattern including an opening corresponding to a space between the two unit cells;

forming a plurality of second auxiliary seal patterns so as to surround each main seal pattern individually, wherein each second auxiliary seal pattern includes a plurality of portions, wherein a portion adjacent to the injection hole of a respective main seal pattern has an opening aligned with the injection hole of a respective main seal pattern;

attaching the second substrate to the first substrate, thereby forming attached substrates;

forming an anti-etching material at the side edges of the attached substrates so as to seal an interval between the first and second substrates;

etching outer surfaces of the attached substrates by dipping into an etchant of an etching device; and separating the attached first and second substrates into the plurality of unit cells, wherein each of the separated unit cells maintains a cell region supported by the respective main seal pattern as well as the respective second auxiliary seal pattern.

50. A method of fabricating a liquid crystal display device, comprising:

preparing first and second substrates having a plurality of unit cells;

forming main seal patterns on one of the first and second substrates, each main seal pattern having at least an injection hole and defining a unit cell;

forming a plurality of auxiliary seal patterns so as to surround each main seal pattern individually, wherein each auxiliary seal pattern includes openings corresponding to the injection hole and four corners of the respective main seal pattern;

attaching the second substrate to the first substrate, thereby forming attached substrates;

forming an anti-etching material at the side edges of the attached substrates so as to seal an interval between the first and second substrates;

etching outer surfaces of the attached substrates by dipping into an etchant of an etching device; and separating the attached first and second substrates into the plurality of unit cells, wherein each of the separated unit cells maintains a cell region supported by the respective main seal pattern as well as the respective auxiliary seal pattern.

* * * * *